US009201241B2

(12) United States Patent
Jayapala et al.

(10) Patent No.: US 9,201,241 B2
(45) Date of Patent: Dec. 1, 2015

(54) CALIBRATION OF MICRO-MIRROR ARRAYS
(71) Applicant: IMEC, Leuven (BE)
(72) Inventors: Murali Jayapala, Leuven (BE); Geert Van Der Plas, Leuven (BE); Veronique Rochus, Liège (BE); Xavier Rottenberg, Kessel-lo (BE); Simone Severi, Leuven (BE); Stéphane Donnay, Herent (BE)
(73) Assignee: IMEC, Leuven (BE)
( * ) Notice: Subject to any disclaimer, the term of this patent is extended or adjusted under 35 U.S.C. 154(b) by 161 days.
(21) Appl. No.: 13/746,149
(22) Filed: Jan. 21, 2013
(65) Prior Publication Data
US 2013/0187669 A1    Jul. 25, 2013
(30) Foreign Application Priority Data
Jan. 20, 2012    (EP) .................................... 12152010
(51) Int. Cl.
*G01R 27/26*    (2006.01)
*G02B 27/00*    (2006.01)
*G02B 1/00*    (2006.01)
*H04N 1/00*    (2006.01)
*G02B 6/35*    (2006.01)
*G02B 26/08*    (2006.01)
(52) U.S. Cl.
CPC ........ *G02B 27/00* (2013.01); *G02B 1/00* (2013.01); *G02B 26/0841* (2013.01); *G02B 6/352* (2013.01); *G02B 6/359* (2013.01); *G02B 26/0825* (2013.01); *G02B 2207/00* (2013.01); *H04N 1/00* (2013.01)
(58) Field of Classification Search
CPC ........ G02B 1/00; G02B 2207/00; G06F 1/00; G06F 2101/00; G01N 1/00; G01N 2201/00; G06T 1/00; G06T 2200/00; B01L 1/00; B01L 2200/00; C12Q 1/00; C12Q 2304/00; G01B 1/00; G01B 2210/00; G03F 1/00; H04N 1/00; H04N 2101/00; G01J 1/00; G05D 1/00
USPC ........................................................ 324/679
See application file for complete search history.

(56) References Cited

U.S. PATENT DOCUMENTS

| | | | | | |
|---|---|---|---|---|---|
| 5,485,304 | A * | 1/1996 | Kaeriyama | .................... | 359/291 |
| 6,906,849 | B1 * | 6/2005 | Mi | ......................... | B81B 7/0006 257/415 |
| 6,963,359 | B1 * | 11/2005 | Aosaki | .................... | G03B 17/52 348/207.2 |
| 2002/0033048 | A1 * | 3/2002 | McIntosh et al. | .......... | 73/514.32 |
| 2007/0081200 | A1 * | 4/2007 | Zomet | ...................... | H04N 1/04 358/484 |
| 2010/0141852 | A1 * | 6/2010 | Jurik | ........................ | G03B 21/00 348/745 |
| 2012/0051049 | A1 * | 3/2012 | Huang | ............... | G02B 27/0961 362/235 |

* cited by examiner

*Primary Examiner* — Huy Q Phan
*Assistant Examiner* — Temilade Rhodes-Vivour
(74) *Attorney, Agent, or Firm* — McDonnell Boehnen Hulbert & Berghoff LLP

(57) ABSTRACT

A built-in self-calibration system and method for a micro-mirror array device, for example, operating as a variable focal length lens is described. The calibration method comprises determining a capacitance value for each micro-mirror element in the array device at a number of predetermined reference angles to provide a capacitance-reference angle relationship. From the capacitance values, an interpolation step is carried to determine intermediate tilt angles for each micro-mirror element in the array. A voltage sweep is applied to the micro-mirror array and capacitance values, for each micro-mirror element in the array, are measured. For a capacitance value that matches one of the values in the capacitance-reference angle relationship, the corresponding voltage is linked to the associated tilt angle to provide a voltage-tilt angle characteristic which then stored in a memory for subsequent use.

9 Claims, 6 Drawing Sheets

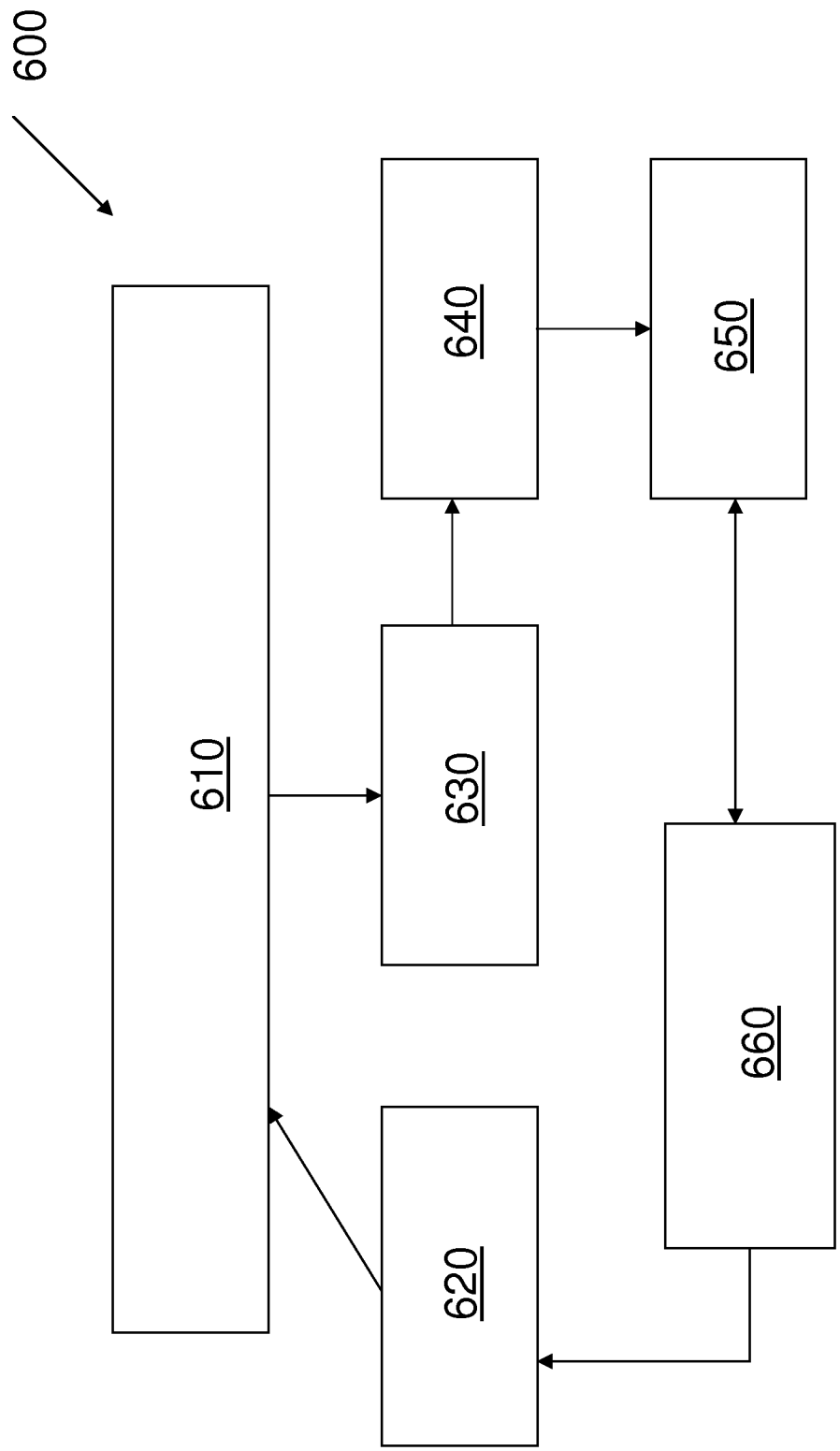

CALIBRATION OF MICRO-MIRROR ARRAYS

CROSS REFERENCE TO RELATED APPLICATIONS

Pursuant to the provisions of 35 U.S.C. §119(b), this application claims priority to EP 12152010.0 filed Jan. 20, 2012, the entire contents of which are incorporated herein by reference.

FIELD

The present invention relates to calibration of micro-mirror array devices, and is more particularly, although not exclusively, concerned with the self-calibration of such array devices when used as a variable focal length lens.

BACKGROUND

Micro-mirror array devices are devices comprising a plurality of microscopically small mirrors arranged in an array. Such devices comprise micro-electromechanical systems (MEMS) devices whose states are controlled by a voltage between electrodes located around the array.

Micro-mirror array devices are operated to tilt along a certain axis (or axes) in order to deflect incident light. Typically, the tilt of the micro-mirror is controlled by the actuation of electrodes associated with the micro-mirror, for example, by using an applied voltage.

Characterisation of voltage against tilt angle for a given micro-mirror device is important in evaluating its performance. Furthermore, this relationship of voltage against tilt angle is also important in calibrating a micro-mirror for use in a certain application, for example, in "smart" lenses where micro-mirrors are used in variable focal length lenses to make zoom lenses. In addition, obtaining or characterising the voltage-tilt angle relationship at run-time is often desirable to support run-time calibration.

Current methods used for characterising voltage against tilt angle of a micro-mirror typically comprise optical metrology techniques. In such techniques, the micro-mirror is inspected using microscopes of some sort. These methods are quite sensitive, reasonably fast and suitable in many cases where characterisation has to be performed only once before the device is put to use.

These optical metrology techniques are not suitable in applications where run-time characterisation is required, for example, where the micro-mirror array device is configured as a variable focal length lens. This is because such metrology systems tend to be time consuming, for example, in order to characterise every micro-mirror element in a micro-mirror array comprising 350,000 micro-mirror elements may require more than 30 minutes. This limits the production throughput, that is, the number of micro-mirror arrays that can be produced in a given period of time.

In addition, optical metrology methods cannot be employed for online or run-time calibration. If the voltage-tilt angle characteristic drifts over a period of operation of a micro-mirror array device, it is not possible to take into account that drift as re-characterisation of voltage-tilt angle characteristic cannot be performed once the micro-mirror array device is operational.

SUMMARY

A built-in self calibration method for a micro-mirror array device operating as a variable focal length lens is described. A built-in self calibration method for micro-mirror array devices operating as light modulating devices is also described. A micro-mirror array device that supports run-time calibration in addition to its main functionality is also described.

In accordance with a first aspect of the present disclosure, there is provided a method of determining a voltage-tilt angle characteristic for a micro-mirror array, the micro-mirror array comprising a plurality of micro-mirror elements, the method comprising the steps of:

a) defining a number of reference tilt angles measured from a neutral position for each micro-mirror element in the micro-mirror array;

b) determining a capacitance measurement for each micro-mirror element corresponding to each reference tilt angle;

c) providing a capacitance-tilt angle characteristic for each micro-mirror element in the micro-mirror array by interpolating capacitance measurements between reference tilt angles for each micro-mirror element;

d) applying a voltage sweep to each micro-mirror element in the micro-mirror array and simultaneously measuring capacitance values for each micro-mirror element during the voltage sweep; and e) using the measured capacitance values to determine the voltage-tilt angle characteristic;

characterised in that step e) comprises matching measured capacitance values with determined capacitance values; and associating the applied voltage with the tilt angle for each matching capacitance value.

In one embodiment, steps b) to e) are performed simultaneously for all micro-mirror elements in the micro-mirror array.

The method comprises the step of storing the voltage-tilt angle characteristic for each micro-mirror element in a memory associated with the micro-mirror array. Preferably, the capacitance-tilt angle characteristic for each micro-mirror element is also stored in a memory associated with the micro-mirror array.

In another embodiment, the method may further comprise using at least the stored voltage-tilt angle characteristic for each micro-mirror element to adjust an output of the micro-mirror array.

In accordance with another aspect of the present disclosure, there is provided a method of calibrating a micro-mirror array comprising a plurality of micro-mirror elements, the method comprising the steps of:

a) using a number of reference tilt angles measured from a neutral position for each micro-mirror element in the micro-mirror array;

b) determining a capacitance measurement for each micro-mirror element corresponding to each reference tilt angle;

c) providing a capacitance-tilt angle characteristic for each micro-mirror element in the micro-mirror array by interpolating capacitance measurements between reference tilt angles for each micro-mirror element;

d) applying a voltage sweep to each micro-mirror element in the micro-mirror array and simultaneously measuring capacitance values for each micro-mirror element during the voltage sweep; and e) using the measured capacitance values to determine a voltage-tilt angle characteristic for each micro-mirror element in the micro-mirror array;

characterised in that step e) comprises matching measured capacitance values with determined capacitance values; and associating the voltage applied during the voltage sweep with the tilt angle for each matching capacitance value.

In accordance with a further aspect of the present disclosure, there is provided a calibration system for a micro-mirror array comprising a plurality of micro-mirror elements, the micro-mirror array having a predetermined number of reference tilt angles measured from a neutral point, the calibration system comprising:

a capacitance measurement module for measuring capacitance values corresponding to the reference tilt angles;

an interpolation module for interpolating capacitance values between reference tilt angles to provide a capacitance-tilt angle characteristic for each micro-mirror element in the micro-mirror array;

an actuation module for applying a voltage sweep to the each micro-mirror element in the micro-mirror array, the capacitance measurement module simultaneously measuring capacitance values generated by the voltage sweep; and a memory for storing voltage-tilt angle characteristics for each micro-memory element;

characterised in that the capacitance measurement module matches the measured capacitance values with determined capacitance values and associates the voltage applied during the voltage sweep with the tilt angle for each matching capacitance value.

The system further comprises a controller for controlling the operation of the actuation module during the voltage sweep. In addition, the controller may control the operation of the micro-mirror elements in accordance with the stored voltage-tilt angle characteristics.

BRIEF DESCRIPTION OF THE DRAWINGS

For a better understanding of the present invention, reference will now be made, by way of example only, to the accompanying drawings in which:

FIG. 6 illustrates a block diagram of a calibration system, according to an example.

DETAILED DESCRIPTION

Figure 1:
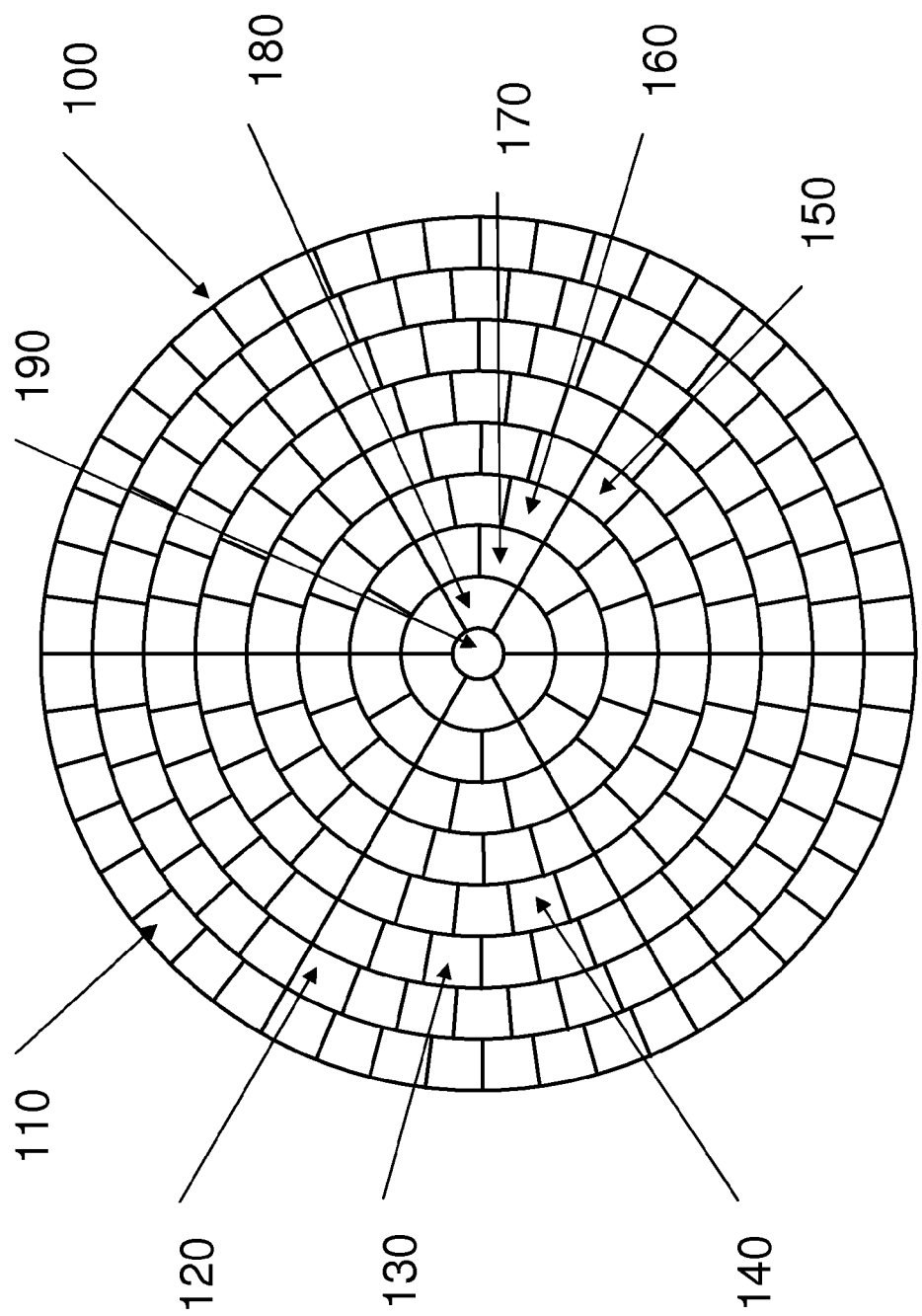
FIG. 1 illustrates a micro-mirror array device, according to an example.

While this disclosure describes particular embodiments with reference to certain drawings, the disclosure is non-limiting. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the figures and these terms are not limitations to the specific embodiments described herein.

Current methods for calibrating micro-mirror array devices involve employing optical metrology systems to characterise a voltage-tilt angle profile or characteristic for every micro-mirror element in the micro-mirror array device. Once the voltage-tilt angle characteristic of every micro-mirror element is known, any two micro-mirror elements in the micro-mirror array can be tilted to the same tilt angle or position by applying a voltage that is appropriate for each micro-mirror element.

In a particular implementation of a micro-mirror array device, the device operates as a variable focal length lens. In order to operate as a variable focal length lens, the micro-mirror array device can be considered to be an analogue device as it needs to be able to provide more than three tilt positions. This is in contrast to digital micro-mirror array devices where tilting is only possible in one of three positions. Matching of tilt angles of a micro-mirror array is an important parameter in order to evaluate the quality of the resulting device in which the micro-mirror array is implemented. When a given voltage is applied to any two or more micro-mirror elements in the array, each micro-mirror element should ideally have the same tilt angle. In reality, there is a mismatch of the tilt angles of these elements for a given applied voltage, and the smaller the value of the mismatch, the higher the quality of the micro-mirror array.

FIG. 1 illustrates a plan view of a polar grid micro-mirror array 100 comprising a plurality of micro-mirror elements arranged in eight concentric rings 110, 120, 130, 140, 150, 160, 170, 180 around a central micro-mirror element 190. In this array, each ring 110, 120, 130, 140, 150, 160, 170, 180 comprises a different number micro-mirror elements as shown and the illustrated array 100 comprises one hundred and nine micro-mirror elements.

However, it will be appreciated that the array may comprise any suitable number of micro-mirror elements arranged in a regular or irregular pattern within the array. In addition, the array is not limited to a polar grid array. Moreover, groups of elements within the array can operate as individual sections, the elements within each section having substantially the same properties. The properties of each section may be the same or different to other sections within the array.

In one embodiment, the array 100 may be divided so that rings 110, 120, 130, 140, 150 comprise an outer section and rings 160, 170, 180 together with the central micro-mirror element comprise an inner section, the inner and outer sections being controlled to tilt independently of one another.

It will be appreciated that the array 100 may be divided in other ways to provide sections which can be controlled to tilt independently of one another in accordance with a particular implementation thereof.

In accordance with the present disclosure, the micro-mirror array is equipped with capacitance measurement circuits from which a voltage-tilt angle characteristic of each micro-mirror element is obtained indirectly by measuring the capacitance of each micro-mirror element as it tilts. While the disclosure references capacitance measurement circuits, it will be appreciated that other forms of electrical measurement may be used, for example, inductance measurements.

Figure 2:
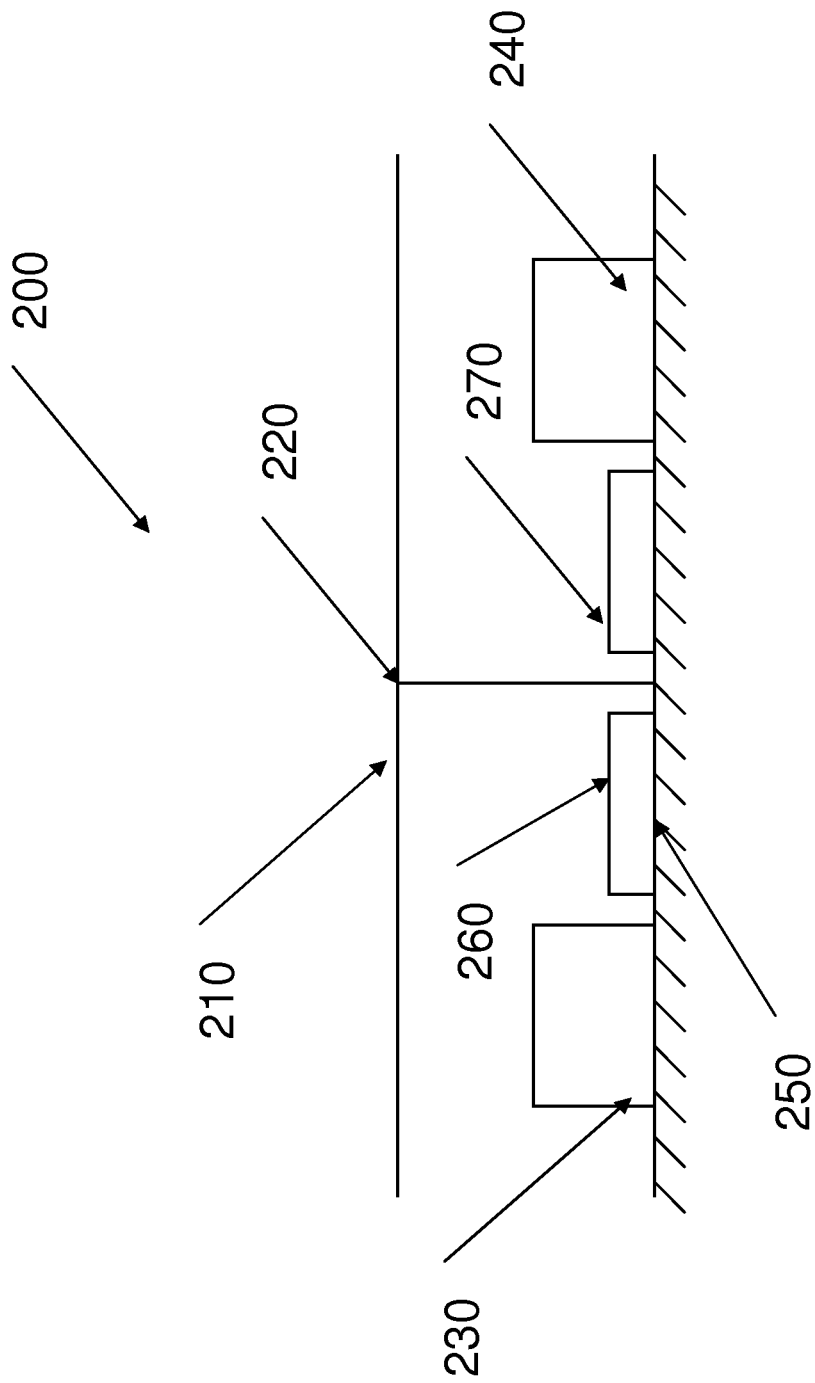
FIG. 2 is a schematic illustration of a micro-mirror element in a neutral position, according to an example.

The operation of the capacitance measurement is described below with reference to FIGS. 2 to 4. In FIG. 2, a micro-mirror element arrangement 200 is shown. The arrangement 200 comprises a micro-mirror element 210 which is mounted at a pivot point or tilt axis 220 about which it can tilt in accordance with applied voltage. Two measurement electrodes 230, 240 are provided, which are mounted on a support 250 and are equally spaced from the pivot point or tilt axis 220. Two actuation electrodes 260, 270 are also provided on the support 250 adjacent respective ones of the measurement electrodes 230, 240. Each actuation electrode 260, 270 is spaced at the same distance from the pivot point or tilt axis 220 and its associated measurement electrode 230, 240. Here, the micro-mirror element 210 is shown in a neutral or substantially horizontal position. It will be appreciated, however, that in certain applications, the neutral position may be at an angle to the horizontal.

In the embodiment shown in FIG. 2, separate electrodes are provided for actuation and capacitance measurement on each side of the pivot point or tilt axis 220. This decouples actuation of the micro-mirror element 210 and measurement of the tilt angle. In addition, the positioning and size of the measurement electrodes 230, 240 can be optimised so that the capacitance measurement is more sensitive than in an arrangement where a single electrode is provided for both actuation of the tilting and measurement of the capacitance induced by the tilting of the micro-mirror element 210. It will be appreciated that the position and size of the actuation electrodes 260, 270 can also be optimised.

Figure 3:
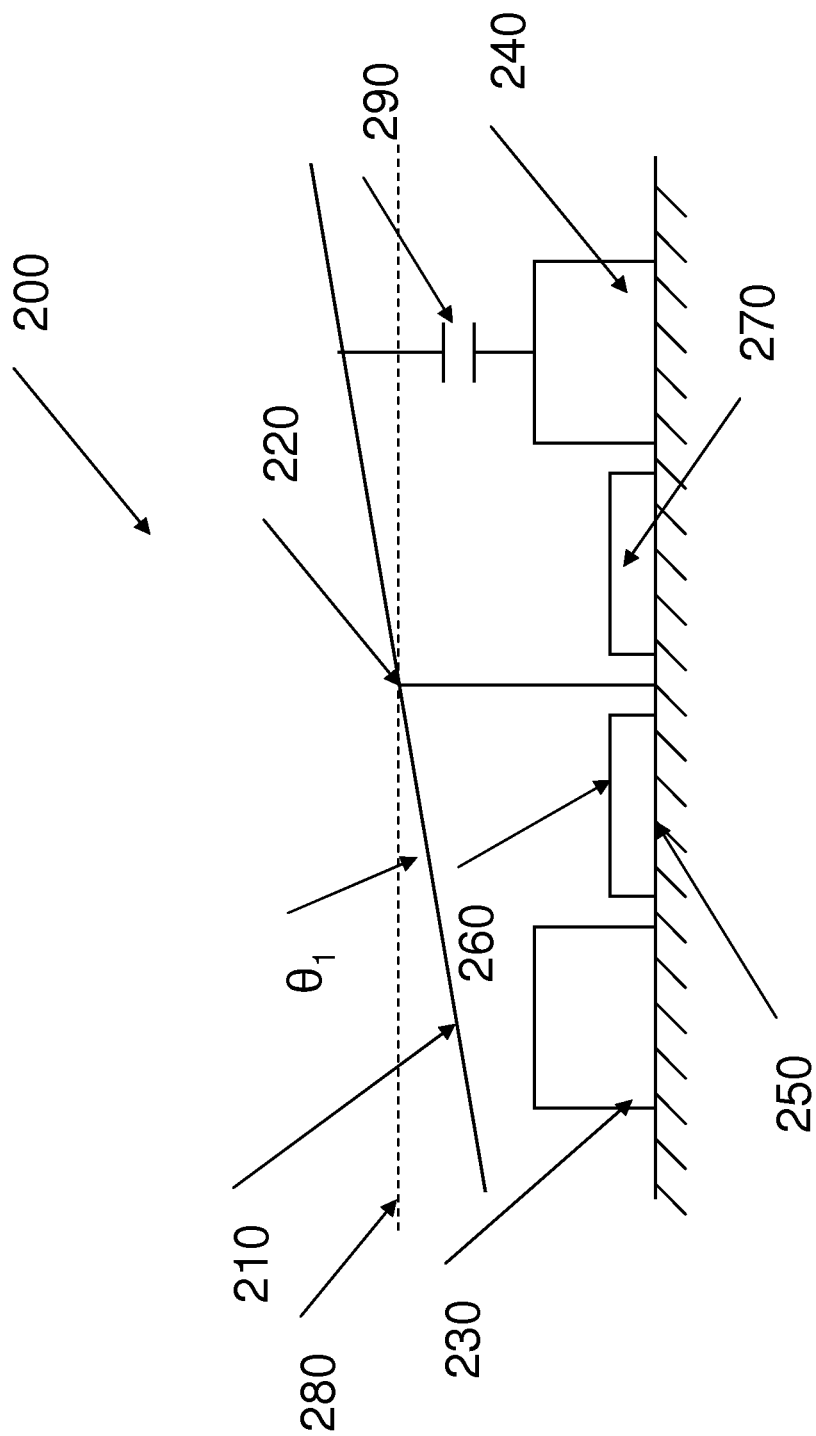
FIGS. 3 and 4 are similar to FIG. 2 but illustrate the micro-mirror element in a first and a second tilt position respectively.

When an actuation voltage is applied to actuation electrode 260, as shown in FIG. 3, the micro-mirror element 210 tilts about the pivot point or tilt axis 220 and a capacitance 290 can be measured at the measurement electrode 240. This capacitance 290, when compared to the capacitance in the neutral or previous position provides a change in capacitance that corresponds to the tilt angle, $\theta_1$, when measured from the horizontal as indicated by dotted line 280.

Figure 4:
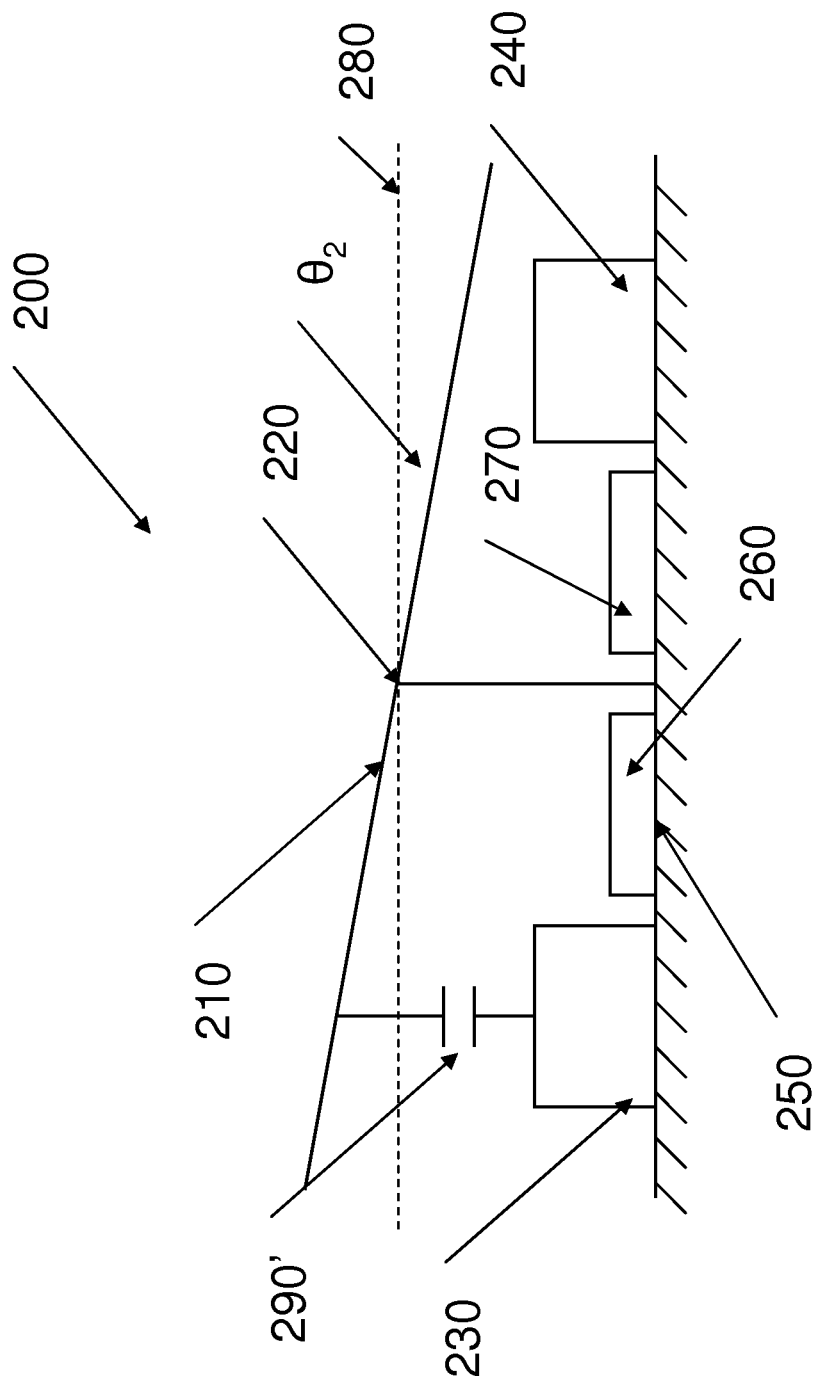

Similarly, in FIG. 4, an actuation voltage applied to actuation electrode 270 causes the micro-mirror element 210 to tilt about the pivot point or tilt axis 220 and to produce a capacitance 290' that can be measured at the measurement electrode 230 as shown. This capacitance 290', when compared to the capacitance in the neutral or previous position provides a change in capacitance which corresponds to the tilt angle, $\theta_2$, when measured from the horizontal as indicated by dotted line 280.

In FIGS. 3 and 4, the horizontal as indicated by dotted line 280 is considered to be the neutral position, but it will be appreciated that any other position can be chosen as the neutral position. In addition, the tilt angle can be measured from a previous position of the micro-mirror element 210 which is not horizontal.

It will be appreciated that the value of the tilt angle $\theta_2$ may be the same as, or different from, the value of the tilt angle $\theta_1$. By measuring the change in capacitance in each case, the tilt angle of the micro-mirror element 210 due to an actuation voltage applied to actuation electrodes 260, 270 can be determined by capacitance measurements taken by the measurement electrodes 230, 240.

Although not shown, a stopper is associated with each actuation and measurement electrode pair, which serves to limit the tilt angle of the micro-mirror element about the pivot point or tilt axis. Each stopper is preferably located adjacent the measurement electrodes 230, 240, but it will be appreciated that the stoppers may be located at any other suitable location.

If pairs of stoppers have the same height, each stopper of the pair can be spaced at a different distance from the pivot point or tilt axis 220. Alternatively, if the pairs of stoppers have different heights, each stopper of the pair is spaced at the same distance from the pivot point or tilt axis 220. The height/position combination for each stopper is used to determine a reference tilt angles for the method as described below with reference to FIG. 5 below.

When a micro-mirror array device having a polar grid array 100 as shown in FIG. 1 is to be used as a variable focal length lens, the tilt angle of each micro-mirror element will be determined in accordance with its location within the micro-mirror array, for example, in accordance with the radius of the polar grid array. The tilt angle of each micro-mirror element at a different radius within the polar grid, as indicated by rings 110, 120, 130, 140, 150, 160, 170, 180, is different. In addition, the tilt angle of the central micro-mirror element 190 may be different or the same as ring 180. As described above, the polar grid may be divided so that the micro-mirror elements in the outer section of the polar grid are tilted to a different extent when compared to the micro-mirror elements in the inner section of the polar grid.

Figure 5:
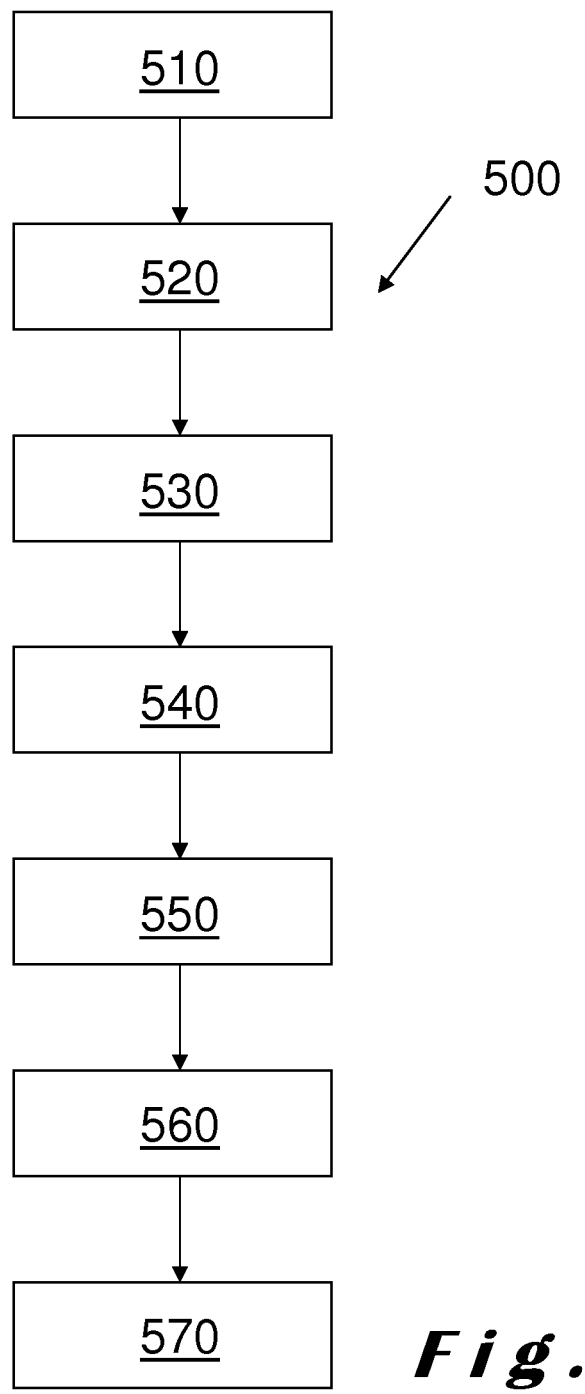
FIG. 5 illustrates a flow chart for a calibration method, according to an example.

A method for determining a voltage-tilt angle characteristic of each micro-mirror element is described below with reference to FIG. 5.

Having provided a micro-mirror array, step 510, the first step in the method is to define two or more reference tilt angles for the micro-mirror array, step 520. Each of these reference tilt angles is obtained using stopper heights and an optical metrology method or any other suitable method. The micro-mirror element is located on one stopper and the associated tilt angle measured, and then the micro-mirror element is moved to be located on another stopper and that associated tilt angle measured. These measured tilt angles form the reference tilt angles. The stoppers used for the determination of the reference tilt angles may be located relative to the same pivot point or tilt axis or may be located relative to different pivot points or tilt axes. The reference tilt angles may be chosen to be 2° and 5°, for example. Naturally, other reference tilt angles may be chosen with difference values being chosen for different pivot points or tilt axes.

In one embodiment, these measurements are performed for only one micro-mirror element per micro-mirror array. In another embodiment, the measurements may be performed for a few micro-mirror elements within a micro-mirror array. By only obtaining the measurements for at most a few micro-mirror elements, the calibration process can be speeded up significantly.

For each of these reference tilt angles, the corresponding capacitance value is measured for each micro-mirror element in the array, step 530. From these measurements, a table of capacitance values is generated for each of the two reference angles for all micro-mirror elements in the array, step 540. The table is completed by interpolating capacitance values for intermediate tilt angles for each micro-mirror element in the array, step 550. The table provides a capacitance-tilt angle characteristic for each micro-mirror element in the array.

The next step is to perform a voltage sweep and simultaneously measure the capacitance values for each micro-mirror element in the array, step 560. For a matching capacitance value, the corresponding voltage is noted and added to the table to provide a voltage-tilt angle characteristic for each micro-mirror element in the micro-mirror array. The voltage-tilt angle characteristic and the capacitance-tilt angle characteristic are then stored in a memory for use during a built-in self-calibration process for the particular micro-mirror array, step 570.

Whilst the step of defining the reference tilt angles, step 520, needs to be performed before the micro-mirror array can be implemented, it will readily be understood that the following steps can be performed at run-time, thus enabling run-time calibration once the micro-mirror array is incorporated into a device.

In addition, steps 530 to 560 can be performed simultaneously, or in parallel, for all the micro-mirror elements in the array, thus making the calibration process very fast.

It will readily be appreciated that, as there is an interpolation step for determining capacitance values for intermediate tilt angles, the more reference tilt angles used, the more accurate the interpolation will be.

The calibration process is carried out using a calibration system which is built into the micro-mirror array. As only few additional logic circuits and memory are required to support the calibration procedure, the self-calibration process is cost effective.

A block diagram of a micro-mirror array device is shown in FIG. 6. In FIG. 6, a calibration system 600 is shown. The system 600 comprises a micro-mirror array device 610, which is connected to an actuation module 620 and a capacitance measurement module 630. Connected to the capacitance measurement module 630 is an interpolation module 640 which is, in turn, connected to a memory 650. A microcontroller 660 is connected to the actuation module 620 and the memory 650.

The actuation module 620 applies a voltage to the micro-mirror array elements in the micro-mirror array device 610 to provide the voltage sweep (step 560) as described above with reference to FIG. 5. The capacitance measurement module 630 measures the capacitance values generated during the voltage sweep. The interpolation module 640 determines the interpolated capacitance values (step 550) and passes them to the memory 650. The microcontroller 660 controls the operation of the actuation module 620.

The actuation module 620 comprises a plurality of electrodes as described above with reference to FIGS. 2 to 4 for applying a driving voltage each micro-mirror element or group of such micro-mirror elements. Similarly, the capacitance measurement module 630 comprises a plurality of sensing electrodes for sensing the capacitance induced due to the tilting of the each micro-mirror element or group of micro-mirror elements.

In one embodiment, the actuation module 620 may also be utilised during operation of the micro-mirror array device as well as during its self-calibration process. Similarly, the capacitance measurement module may also be utilised during operation of the micro-mirror array device.

The capacitance measurement module 630 also matches the measured capacitance values with determined capacitance values and associates the voltage applied during the voltage sweep with the tilt angle for each matching capacitance value. From these matching capacitance values, the corresponding tilt angle can be determined and associated with the corresponding voltage applied during the voltage sweep.

Although the present invention has been described with reference to a polar grid micro-mirror array operating as a variable focal length lens, it will be appreciated that the calibration method and system of the present invention may also be applied to other micro-mirror array devices, for example, light modulating devices.

The invention claimed is:

1. A method of determining a voltage-tilt angle characteristic for a micro-mirror array, the micro-mirror array comprising a plurality of micro-mirror elements, the method comprising:
   a) defining a number of reference tilt angles measured from a neutral position for each micro-mirror element in the micro-mirror array;
   b) determining a capacitance value for each micro-mirror element corresponding to each reference tilt angle;
   c) providing a capacitance-tilt angle characteristic for each micro-mirror element in the micro-mirror array by interpolating the determined capacitance values between reference tilt angles for each micro-mirror element;
   d) applying a voltage sweep to each micro-mirror element in the micro-mirror array and simultaneously measuring capacitance values for each micro-mirror element during the voltage sweep; and
   e) using the measured capacitance values to determine the voltage-tilt angle characteristic;
   wherein step e) comprises matching the measured capacitance values with the determined capacitance values of the capacitance-tilt angle characteristics and associating the voltage applied during the voltage sweep with the tilt angle for each matching capacitance value.

2. A method according to claim 1, wherein steps b) to e) are performed simultaneously for all micro-mirror elements in the micro-mirror array.

3. A method according to claim 1, further comprising the step of storing the voltage-tilt angle characteristic for each micro-mirror element in a memory associated with the micro-mirror array.

4. A method according to claim 3, further comprising the step of storing the capacitance-tilt angle characteristic for each micro-mirror element in a memory associated with the micro-mirror array.

5. A method according to claim 4, further comprising the step of using at least the stored voltage-tilt angle characteristic for each micro-mirror element to adjust an output of the micro-mirror array.

6. A method of calibrating a micro-mirror array comprising a plurality of micro-mirror elements, the method comprising:
   a) using a number of reference tilt angles measured from a neutral position for each micro-mirror element in the micro-mirror array;
   b) determining a capacitance value for each micro-mirror element corresponding to each reference tilt angle;
   c) providing a capacitance-tilt angle characteristic for each micro-mirror element in the micro-mirror array by interpolating the determined capacitance values between reference tilt angles for each micro-mirror element;
   d) applying a voltage sweep to each micro-mirror element in the micro-mirror array and simultaneously measuring capacitance values for each micro-mirror element during the voltage sweep; and
   e) using the measured capacitance values to determine a voltage-tilt angle characteristic for each micro-mirror element in the micro-mirror array;
   wherein step e) comprises matching the measured capacitance values with the determined capacitance values of the capacitance-tilt angle characteristics and associating the voltage applied during the voltage sweep with the tilt angle for each matching capacitance value.

7. A calibration system for a micro-mirror array comprising a plurality of micro-mirror elements, the micro-mirror array having a predetermined number of reference tilt angles measured from a neutral point, the calibration system comprising:
   a capacitance measurement module for determining capacitance values corresponding to the reference tilt angles;
   an interpolation module for interpolating the determined capacitance values between reference tilt angles to provide a capacitance-tilt angle characteristic for each micro-mirror element in the micro-mirror array;
   an actuation module for applying a voltage sweep to each micro-mirror element in the micro-mirror array, the capacitance measurement module configured to simultaneously measure capacitance values generated by the voltage sweep; and
   a memory for storing voltage-tilt angle characteristics for each micro-memory element;
   wherein the capacitance measurement module is configured to determine the voltage-tilt angle characteristics by matching the measured capacitance values with the determined capacitance values of the capacitance-tilt angle characteristics and associating the voltage applied during the voltage sweep with the tilt angle for each matching capacitance value.

8. A calibration system according to claim 7, further comprising a controller for controlling the operation of the actuation module during the voltage sweep.

9. A calibration system according to claim 8, wherein the controller controls operation of the micro-mirror elements in accordance with the stored voltage-tilt angle characteristics.

* * * * *